US011278990B2

(12) United States Patent
McGovern et al.

(10) Patent No.: US 11,278,990 B2
(45) Date of Patent: Mar. 22, 2022

(54) WELD INSPECTION SYSTEM AND METHOD

(71) Applicant: GM GLOBAL TECHNOLOGY OPERATIONS LLC, Detroit, MI (US)

(72) Inventors: Megan E. McGovern, Royal Oak, MI (US); Teresa J. Rinker, Royal Oak, MI (US); Ryan C. Sekol, Grosse Pointe Woods, MI (US); Sean R. Wagner, Shelby Township, MI (US); Ronald M. Lesperance, Troy, MI (US); James G. Schroth, Troy, MI (US); Michael J. Bland, Clarkston, MI (US); Diana M. Wegner, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 349 days.

(21) Appl. No.: 16/525,738

(22) Filed: Jul. 30, 2019

(65) Prior Publication Data
US 2021/0031309 A1 Feb. 4, 2021

(51) Int. Cl.
*G01N 21/71* (2006.01)
*B23K 31/12* (2006.01)
*G01N 21/17* (2006.01)

(52) U.S. Cl.
CPC ......... *B23K 31/125* (2013.01); *G01N 21/171* (2013.01); *G01N 21/71* (2013.01)

(58) Field of Classification Search
CPC .............. G01N 25/72; G01N 21/88; G01N 2021/8861; G01N 21/93; H04N 5/332
See application file for complete search history.

(56) References Cited

U.S. PATENT DOCUMENTS

2006/0204037 A1* 9/2006 Watanabe .......... G06K 9/00805
382/104
2015/0339830 A1* 11/2015 Heissenstein ............ H04N 5/33
348/90

* cited by examiner

*Primary Examiner* — David P Porta
*Assistant Examiner* — Fani Boosalis
(74) *Attorney, Agent, or Firm* — Cantor Colburn LLP

(57) ABSTRACT

A computer software product adapted for use in a weld inspection system is executed by a processor and is stored in an electronic storage medium of the weld inspection system adapted to facilitate the inspection of a weld of a work product. The computer software product includes a first module and a combination module. The first module is configured to transform first and second raw thermal images, associated with respective first and second heat pulses of at least a portion of the work product having the weld, into respective first and second binary images. The combination module is configured to transform the first and second binary images into a combined binary image for the reduction of noise.

17 Claims, 9 Drawing Sheets

WELD INSPECTION SYSTEM AND METHOD

The subject disclosure relates to a weld inspection system, and more particularly to a thermographic and non-destructive weld inspection system and method of operation.

Many traditional methods of inspecting welds do not allow for one-hundred percent weld inspection. Furthermore, such methods may include undesirable destructive testing audits and visual inspections. In general, known methods may require contact with the work product and are time consuming to perform. More current methods apply thermographic technology. However, known thermographic methods are highly sensitive toward thermal reflection of the work product, and often entail an additional step of painting the weld matte black.

Accordingly, it is desirable to provide a more robust weld inspection system and method of operation that is capable of removing negative attributes of thermal reflection and other interfering thermal image noise.

SUMMARY

A computer software product according to one, non-limiting, embodiment of the present disclosure is adapted for use in a weld inspection system is executed by a processor and is stored in an electronic storage medium of the weld inspection system adapted to facilitate the inspection of a weld of a work product. The computer software product includes a first module and a combination module. The first module is configured to transform first, and second raw thermal images associated with respective first and second heat pulses of at least a portion of the work product having the weld, into respective first and second binary images. The combination module is configured to transform the first and second binary images into a combined binary image for the reduction of noise.

In addition to the foregoing embodiment, each of the first and second binary images, and the combined binary image include an array of pixel locations, and the first module is configured to assign a binary value to each pixel location of the first and second binary images based on an evaluation of the corresponding location of the respective first and second raw thermal images.

In the alternative or additionally thereto, in the foregoing embodiment, the combination module is configured to apply a mathematical operator to each pixel location of the first binary image and the corresponding pixel location of the second binary image to generate the combined binary image.

In the alternative or additionally thereto, in the foregoing embodiment, the combination module includes at least one of a hard-And routine, a soft-And routine, and an Or logic gate.

In the alternative or additionally thereto, in the foregoing embodiment, the computer software product further comprises a second module being at least one of a saturation module and a Heat Source Distribution (HSD) module. The saturation module is configured to transform the first and second raw thermal images into respective first and second saturation binary images. The HSD module is configured to transform the first and second raw thermal images into respective first and second HSD binary images. The combination module is configured to transform the first and second saturation binary images into a combined second binary image when the saturation module is applied. The combination module is configured to transform the first and second HSD binary images into the combined second binary image when the HSD module is applied. The first module is a data roughness module, the first and second binary images are first and second roughness binary images, and the combined binary image is a combined roughness binary image. The combination module is further configured to at least apply a mathematical operator to the combined roughness binary image and the combined second binary image to reduce noise and generate a compiled binary image.

In the alternative or additionally thereto, in the foregoing embodiment, the computer software product further comprises a saturation module configured to transform the first and second raw thermal images into respective first and second saturation binary images. The combination module is configured to transform the first and second saturation binary images into a combined saturation binary image. The first module is an HSD module, the first and second binary images are first and second HSD binary images, and the combined binary image is a combined HSD binary image. The combination module is further configured to at least apply a mathematical operator to the combined HSD binary image and the combined saturation binary image to reduce noise and generate a compiled binary image.

In the alternative or additionally thereto, in the foregoing embodiment, the computer software product further comprises an image geometry process module configured to evaluate the compiled binary image via geometry of the image itself.

In the alternative or additionally thereto, in the foregoing embodiment, the computer software product further comprises an HSD-Shift module configured to transform the first and second raw thermal images into respective first and second HSD-Shift binary images. The combination module is configured to transform the first and second HSD-Shift binary images into a combined HSD-Shift binary image. The combination module is further configured to at least apply a mathematical operator to the combined HSD binary image, the combined HSD-Shift binary image, and the combined saturation binary image to reduce noise and generate the compiled binary image.

In the alternative or additionally thereto, in the foregoing embodiment, the computer software product further comprises an image geometry process module configured to evaluate the compiled binary image via geometry of the image itself to reduce noise and generate a refined compiled binary image.

In the alternative or additionally thereto, in the foregoing embodiment, the computer software product further comprises a roughness module configured to transform the first and second raw thermal images into respective first and second roughness binary images. The combination module is configured to transform the first and second roughness binary images into a combined roughness binary image. The combination module is further configured to at least apply a mathematical operator to the combined HSD binary image, the combined saturation binary image, the combined saturation binary image, and the combined roughness binary image to reduce noise and generate the compiled binary image.

In the alternative or additionally thereto, in the foregoing embodiment, the computer software product further comprises a weld assessment module configured to evaluate the refined compiled binary image and apply weld geometry to assess the weld.

In the alternative or additionally thereto, in the foregoing embodiment, the assessment of the weld includes a comparison of a weld perimeter to a preprogrammed weld perimeter threshold value.

A non-transient computer readable medium according to another, non-limiting, embodiment, contains program instructions for causing a system to perform a method. The method includes establishing a reference point relative to a compiled binary image of a work product. An image of a weld of the work product is windowed relative to the reference point. Weld blobs are then identified and segmented. The weld blobs are extracted to generate a refined compiled binary image for weld assessment. The binary weld blobs are multiplied by at least one of raw data and processed thermal data for weld assessment.

Additionally, to the foregoing embodiment, the method includes geometrically assessing a weld image of the refined compiled binary image to determine weld quality. The geometric assessment includes locating the weld and performing a pixel distribution analysis.

In the alternative or additionally thereto, in the foregoing embodiment, the geometric weld assessment measures a weld perimeter and compares the weld perimeter to a pre-programmed weld perimeter threshold value.

A weld inspection system according to another, non-limiting, embodiment is adapted to inspect a weld of a work product. The weld inspection system includes a heat source assembly, a thermal imaging camera, and a controller. The heat source assembly is adapted to sequentially direct first and second heat pulses upon the work product from varying perspectives and within respective first and second time durations. The thermal imaging camera is configured to generate at least one first raw thermal image during the first-time duration and at least one second raw thermal image during the second time duration. The at least one first raw thermal image is associated with the first heat pulse and the at least one second raw thermal image is associated with the second heat pulse. The controller is configured to control the heat source assembly and the thermal imaging camera. The controller includes a processor configured to receive the at least one first and second raw thermal images and execute instructions. The instructions include at least two modules including at least two of a roughness module, a saturation module, a Heat Source Distribution (HSD) module, and an HSD-Shift module. The roughness module is configured to transform at least one of the first and second raw thermal images into respective first and second roughness binary images when applied. The saturation module is configured to transform the first and second raw thermal images into respective first and second saturation binary images when applied. The HSD module is configured to transform the first and second raw thermal images into respective first and second HSD binary images when applied. The HSD-Shift module is configured to transform the at least one first and second raw thermal images into respective first and second HSD-Shift binary images when applied. A combination module of the instructions is configured to transform the first and second roughness binary images into a combined roughness binary image, transform the first and second saturation binary images into a combined saturation binary image, transform the first and second HSD binary images into a combined HSD binary image, and transform the first and second HSD-Shift binary images into a combined HSD-Shift binary image for the reduction of noise. The combination module is further configured to transform at least two of the combined roughness binary image, the combined saturation binary image, the combined HSD binary image, and the combined HSD-Shift binary image into a compiled binary image for the reduction of noise.

Additionally, to the forgoing embodiment, each of the first and second HSD binary images, the combined HSD binary image, the first and second saturation binary images, and the combined saturation binary image include a common array of pixel locations. The HSD module is configured to assign a respective binary value to each pixel location of the first and second HSD binary images based on an evaluation of the corresponding location of the respective at least one first and at least one second raw thermal images. The saturation module is configured to assign a respective binary value to each pixel location of the first and second saturation binary images based on an evaluation of the corresponding location of the respective at least one first and at least one second raw thermal images.

In the alternative or additionally thereto, in the foregoing embodiment, the combination module is configured to apply a mathematical operator to each pixel location of the first HSD binary image and the corresponding pixel location of the second HSD binary image to generate the combined HSD binary image. The combination module is configured to apply a mathematical operator to each pixel location of the first saturation binary image and the corresponding pixel location of the second saturation binary image to generate the combined saturation binary image.

In the alternative or additionally thereto, in the foregoing embodiment, the combination module is further configured to at least apply a mathematical operator to the combined HSD binary image and the combined saturation binary image to reduce noise and at least in-part generate a compiled binary image.

In the alternative or additionally thereto, in the foregoing embodiment, the weld inspection system further comprises an image geometry process module configured to evaluate the compiled binary image via geometry of the image itself.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
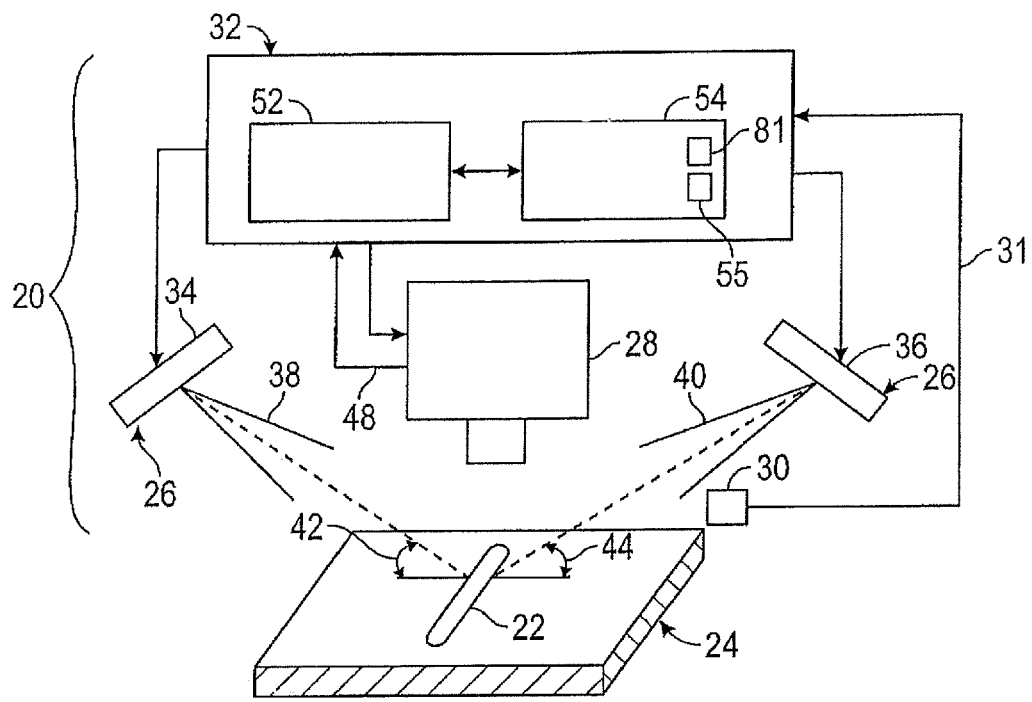
FIG. 1 is a schematic of a weld inspection system as one exemplary, non-limiting embodiment of the present disclosure.

In accordance with an exemplary embodiment, and referring to FIG. 1, a weld inspection system 20 is adapted to inspect a weld 22 upon a work product 24. Although the work product 24 may be any product with the weld 22, one example of a work product may be a battery tab or terminal, and the weld 22 may be a joint weld. More specifically, the work product 24 may generally be the interface between a battery tab and a bus bar, with the weld 22 being a metal-to-metal laser weld. Further examples of a work product 24, ideal for the present weld inspection system 20, include products made of materials with low emissivity (i.e., high reflectivity). Low emissivity products include products having an emissivity of less than about 0.9. For example, polished aluminum has an emissivity of about 0.05, polished copper has an emissivity of about 0.03, polished silver has an emissivity of about 0.025, and polished nickel has an emissivity of about 0.05. Although the present system is ideal for work products having low emissivity, the present system may also be applied to products of higher emissivity because more traditional thermal weld inspection systems are not reliable when applied to a low emissivity work product due to reflection.

The weld inspection system 20 may include a heat source assembly 26, a thermal imaging camera 28, a light intensity sensor 30, and a controller 32. In one example, the heat source assembly 26 includes a plurality of heat sources (i.e., two illustrated as 34, 36). Each heat source 34, 36 is controlled by the controller 32, and is adapted to sequentially emit respective heat pulses 38, 40 that facilitate controlled heating of the work product 24 and weld 22 to be inspected. The heat pulses 38, 40 are directed at the work product 24 from different, respective, perspectives. In the illustrated embodiment, the perspectives are represented by incident angles (see arrows 42, 44), and may be predetermined to maximize reflection differences of the heat pulses 38, 40 upon the work product 24.

The wavelength, or wavelength range, of the heat pulses 38, 40, and thus the type of heat sources 34, 36, may at least in-part be dependent upon the material of the work product 24. That is, the energy from the heat pulses 38, 40 is desirably absorbed by the work product 24 as oppose to being reflected off of the work product 24. For example, aluminum has a reflectivity between eighty-five percent and ninety-nine percent (85%-99%) for radiation wavelengths in the infrared range (i.e., 700 nm to 1 mm), therefore light sources with a wavelength of above one micron should be avoided because nearly all of the energy from the heat pulse would be reflected off of the aluminum work product surface, and not absorbed. In another example, copper has a high reflectivity in the infrared range of about ninety-nine percent (99%) but has a much lower reflectivity of about thirty percent to sixty percent (30%-60%) in the ultraviolet range (i.e., 10 nm to 400 nm). With the above noted considerations, one preferred example of heat source(s) 34, 36 may be, or may include, a Xenon flashtube which emits radiation at a broad wavelength spectrum (i.e., about 200 nm to 900 nm). Other examples of heat sources 34, 36 may include light emitting diodes (LEDs), and lasers.

Accordingly, the light intensity sensor 30 may be any sensor constructed to measure within the wavelength range of the chosen heat sources 34, 36 (i.e., sensitive to the wavelength of light emitted by the heat source assembly 26). The light intensity sensor 30 is configured to communicate with the controller 32 by sending a light intensity signal 31 to the controller 32. Via the signal 31, the controller 32 is configured to verify proper operation of the heat source assembly 26. The light intensity sensor 30 (e.g., meter) may be placed near the work product 24 to monitor the heat pulses 38, 40 to ensure the correct excitation intensity. The sensor 30 may be one or multiple sensors needed to provide proper coverage of the work product 24.

Figure 2:
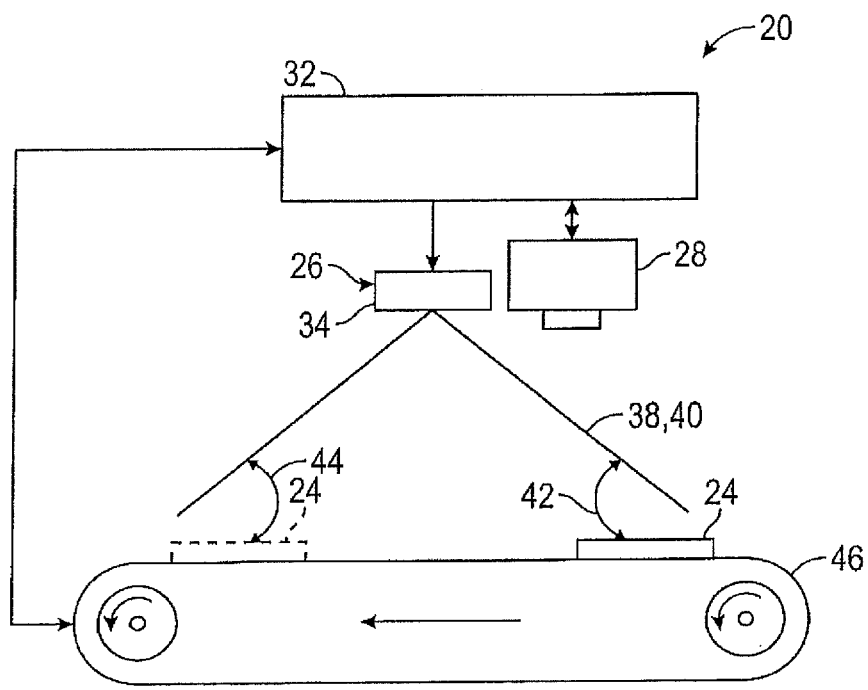
FIG. 2 is a schematic of a second embodiment of a weld inspection system.

Referring to FIG. 2, another embodiment of the weld inspection system 20 is illustrated. In this embodiment, the heat source assembly 26 includes only one heat source 34 that may be stationary. The heat source 34 is adapted to successively emit both heat pulses 38, 40. The differing perspectives 42, 44 may be achieved by moving the work product 24 via a positioning mechanism 46 (e.g., conveyor belt). Alternatively, and although not illustrated, the positioning mechanism 46 may move the heat source 34, and the work product 24 may remain stationary during the inspection. In both examples, the controller 32 may control the positioning mechanism 46, including a controlled rate of speed that corresponds with the sequential heat pulses 38, 40 and desired perspectives 42, 44.

In yet other embodiments not illustrated, the size of the work product 24 and/or weld 22 to be inspected, may dictate the need for multiple thermal imaging cameras 28 each associated with a respective heat source assembly 26. In other embodiments, the cameras 28 may share at least a part of adjacent heat source assemblies 26. In yet other embodiments, the heat source assembly 26 may include more than two heat sources. For example, the heat source assembly 26 may include two pairs of heat sources, such that the first pair emits a first round of heat pulses 38, 40, and while the first pair recharges, the second pair may emit a second round of heat pulses 38, 40.

Referring again to FIG. 1, and in one embodiment, the thermal imaging camera 28 is an infrared (IR) camera and may generally be a video camera adapted to generate thermal imaging data (i.e., see arrow 48). The thermal imaging data 48 is, or includes, a plurality of frames or images 50 (also see FIG. 3) of the work product 24 taken at a predetermined and/or controlled frequency by the controller 32. The IR camera 28 is controlled by the controller 32 and is generally synced with operation of the heat source assembly 26.

The controller 32 is configured to communicate with the heat source assembly 26, the camera 28, the light intensity sensor 30, and if applied, the positioning mechanism 46. As used herein, the term "controller" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As illustrated, the controller 32 includes at least one processor 52 and at least one electronic storage medium 54. The processor 52 is any combination of one or more of a central processing unit (CPU), multiprocessor, microcontroller unit (MCU), digital signal processor (DSP), application specific integrated circuit, and others capable of executing software instructions or otherwise controllable to behave according to predetermined logic. The storage medium 54 is, optionally, any combination of read and write memory (RAM) and read only memory (ROM). The storage medium 54 may also include persistent storage, which can be any single one, or combination of, solid state memory, magnetic memory, and optical memory storing a computer program (i.e., application) with software instructions. In one example, the storage medium 54 may be non-transitory.

Figure 3:
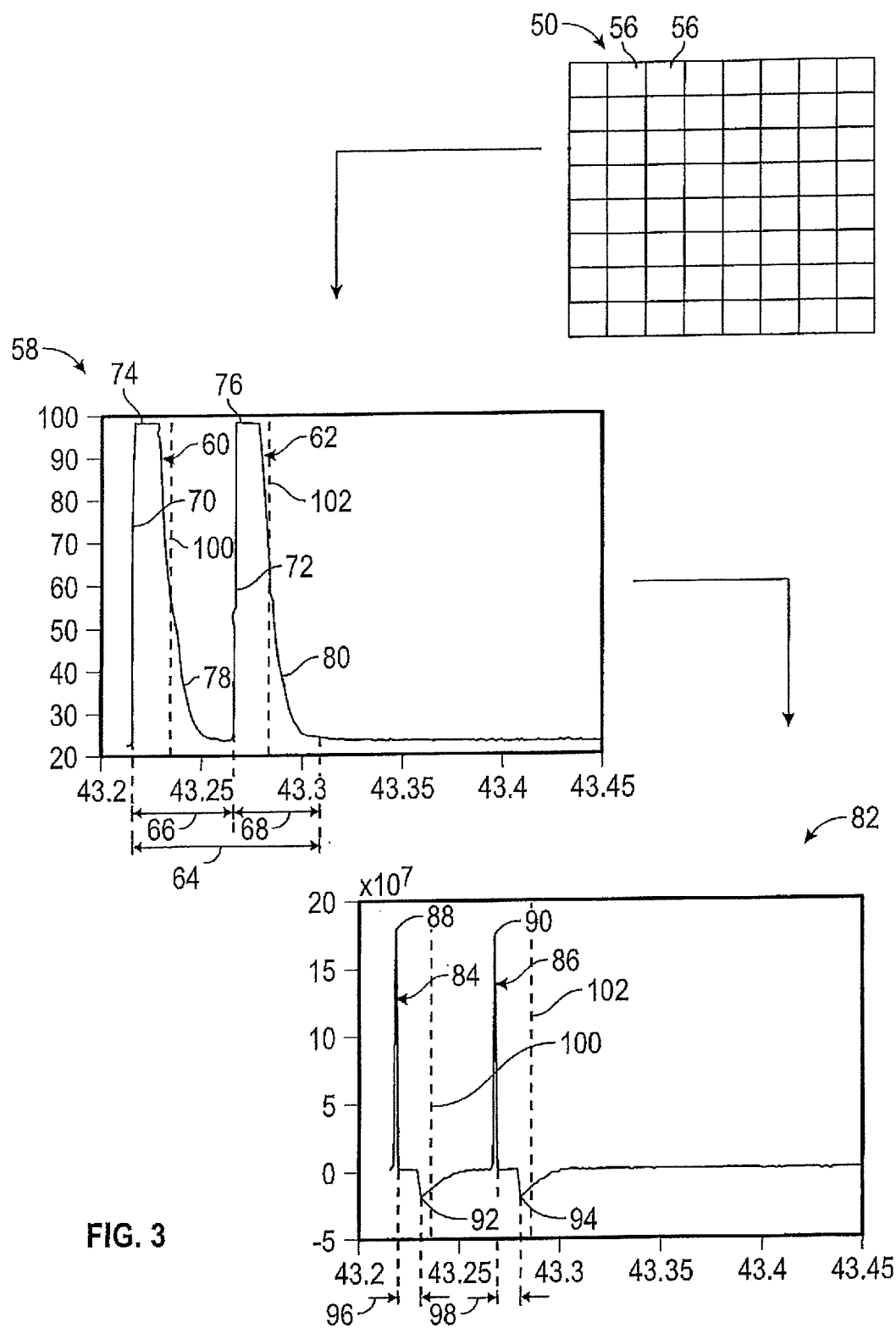
FIG. 3 is a flow diagram illustrating images and graphs depicting the processing of thermal imaging data of the weld inspection system.

Referring to FIG. 3, the frame 50 of the thermal imaging data 48 taken by the thermal imaging camera 28 and processed by the controller 32 is generally illustrated. The controller 32 executes instructions 55 (i.e., computer software product, see FIG. 1) to collect the pixels 56 containing thermal information from the camera 28 for each frame 50. For this example, sixty-four pixels are shown for illustrative purposes. In other embodiments, each frame 50 may contain a relatively small number of pixels (e.g., about six hundred (600) pixels) or up to a large number of pixels (e.g., 800,000 pixels). Once a window size is set, each frame 50 will contain the same number of pixels 56.

The controller 32 is configured to then produce a thermal graph 58 of each pixel 56 of each frame 50. The thermal graph 58 includes horizontal axis (i.e., x-axis) of time in seconds and a vertical axis (i.e., y-axis) of temperature in Centigrade (i.e., time verse temperature graph). The thermal graph 58 depicts the heating and cooling down of the work product 24 for a specific pixel 56. A first thermal spike 60 represents the thermal results of the first heat pulse 38, and a second thermal spike 62 represents the thermal results of the second heat pulse 40. To optimize inspection times, separation of the thermal spikes 60, 62 is minimized and generally dictated by how long the it takes the work product 24 to substantially cool down after the first heat pulse 38. In the present example, the thermal spikes 60, 62, together, span over a time period (see arrow 64) that may be predetermined, and in one example is about seventy milliseconds (70 ms). Each time period 64 includes a first-time duration (see arrow 66) associated with the first thermal spike 60, and a second time duration (see arrow 68) associated with the second thermal spike 62. In the example of a time period being about seventy milliseconds, each time duration 66, 68 may be about thirty-five milliseconds (35 ms). It is further understood that the time period 64, may be low as about forty milliseconds (40 ms). Regardless, the time period 64 is generally indicative of the time that the thermal imaging camera 28 is taking images, and is, at least in-part, dictated by the work product material and thermal properties. It is further contemplated and understood that the heat source assembly 26 of the weld inspection system 20 may include more than the two heat sources 34, 36, thus more than two successive heat pulses.

In one example, the saturated image may simply be a frame where some or all of the pixels 56 are saturated. Knowing that the pixels corresponding to the weld 24 will remain saturated longer than the shiny background (i.e., remainder of the work product 24, or non-weld pixels), a frame 50 is chosen in time where primarily the weld pixels are the only pixels saturated. In this respect, the thermal graph 58 is generally "clipped," meaning the weld pixels are saturated at the points in time where the temperature reading is above an upper threshold limit, such as above ninety-eight degrees Centigrade (98° C.). This threshold limit is dependent upon the operating temperature range of the thermal imaging camera 28. It is contemplated and understood that in other embodiments, the saturation temperature, characteristic of the camera, may not be applied. Instead, an arbitrary saturation temperature may be set that is less than the camera saturation temperature. Furthermore, this thresholding technique can be used prior to thermal excitation based on emissivity differences between welded and un-welded areas.

The thermal spikes 60, 62 include respective heat up regions 70, 72, respective saturation regions 74, 76, and respective cool down regions 78, 80. The saturation regions 74, 76 are located at the top, or tip, of each thermal spike 60, 62 (i.e., illustrated as horizontal lines), and can be indicative of a weld location at the appropriate frame(s). That is, the pixels 56 corresponding to the weld areas of the work product 24 will have longer saturation regions 74, 76 than pixels corresponding to areas of the work product 24 that do not contain a weld. Therefore, when analyzing each frame, or image, 50, the controller 32 may utilize the saturation regions 74, 76, and at least one predefined threshold 81 (see FIG. 1), that may be stored in the storage medium 54 to determine weld locations at a pixel level.

The saturation regions 74, 76 are caused either by the work product 24 heating beyond the temperature scale of the camera 28 (i.e., in a given measuring band), or by the energy from the heat source assembly 26 reflecting off of the work product 24 and into the camera detector. The welds 22 initially appear to remain hotter, and stay saturated longer, because the weld 22 has higher emissivity than the surrounding non-welded area of the work product 24. The thermal energy must flow through the weld 22 to get from the front to the back of the work product 24; thus, the surface of the weld 22 cools faster than the surrounding non-welded area. Also, the camera pixel 56 may saturate if the work product 24 is at an angle with respect to the heat source assembly 26 that reflects energy into the camera 28. The weld 22 further has texture (i.e., more angles) to direct light back at the camera 28.

In some applications, raw temperature data, such as that illustrated in the thermal graph 58 is susceptible to environmental conditions. Therefore, to develop a more robust graph, the instructions 55 executed by the controller 32 may apply the following equation:

$$HSD = g(x, y, t) = (k/\alpha)(\partial T/\partial t) - k\left[\frac{(\partial^2 T)}{(\partial x^2)} + \frac{(\partial^2 T)}{(\partial y^2)}\right]$$

This equation obtains a heat source distribution (HSD) graph 82 having an x-axis of time and a y-axis of HSD. The HSD is a function of "x," "y," and "t," where "x" represents the x-axis (i.e., horizontal axis) of the thermal frame 50, "y" represents the y-axis (vertical axis) of the thermal frame 50, and "t" represents time in the thermal graph 58. Moreover, "k" is thermal conductivity, "a" is the thermal diffusivity, "∂T/∂t" is the partial derivative of temperature with respect to time, and "$\partial^2 T/\partial x^2$" and "$\partial^2 T/\partial y^2$" are the second partial derivatives of temperature with respect to "x" and "y."

The HSD graph 82 includes a horizontal axis (i.e., x-axis) of time in seconds and a vertical axis (i.e., y-axis) of HSD. The HSD graph 82 depicts HSD spikes 84, 86 associated with the respective heat up regions 70, 72 of the respective thermal spikes 60, 62, and extend from an HSD value of zero to a maximum HSD value (i.e., the respective spike tips 88, 90). Extending forward in time from the tips 88, 90 of each HSD spike 84, 86 to a maximum negative HSD value (i.e., respective valley regions 92, 94) are respective HSD-Shifts (i.e., see arrows 96, 98). The HSD-Shifts 96, 98 may be used to identify regions where the emissivity values are different and are a measure for how long the pixels remain saturated. The HSD-Shifts 96, 98 are directly measuring how long the pixel stays saturated. This is useful for a sample where the top sheet is totally "burnt-through," leaving the shiny sheet below exposed. In this case, the shiny sheet below will not remain saturated long due to the low emissivity of the shiny sheet below. Alternatively, the lengths of the respective saturation regions 74, 74 in the thermal graph 58 may be measured.

The thermal graph 58 and the HSD graph 82 each include reference lines 100, 102 (i.e., illustrated as vertical lines) indicating the time at which an HSD is used. The data for HSD is available along the entire recorded time. In this example, the HSD is used at a specific time (which, since it is a derivative in time, uses two successive frames for a corresponding pixel from the raw time data) after each excitation. That is, the HSD is a second derivative in space (i.e., "x" and "y"). The time after the excitation is not always the same after the first and second excitations. For the final weld assessment, the HSD data can be averaged between the images associated with the first and second heat pulses 38, 40. In other examples, the HSD could be used at several points after one or both excitations and combined in various ways to develop an indicator of thermal transfer based on excitation. For example, the slope of the HSD during the cool-down region 78 could be used. The slopes applied are where the reference line 100 crosses the cool down region 78 of the thermal spike 60, and where the reference line 102 crosses the cool down region 80 of the thermal spike 62 in the thermal graph 58.

Figure 4:
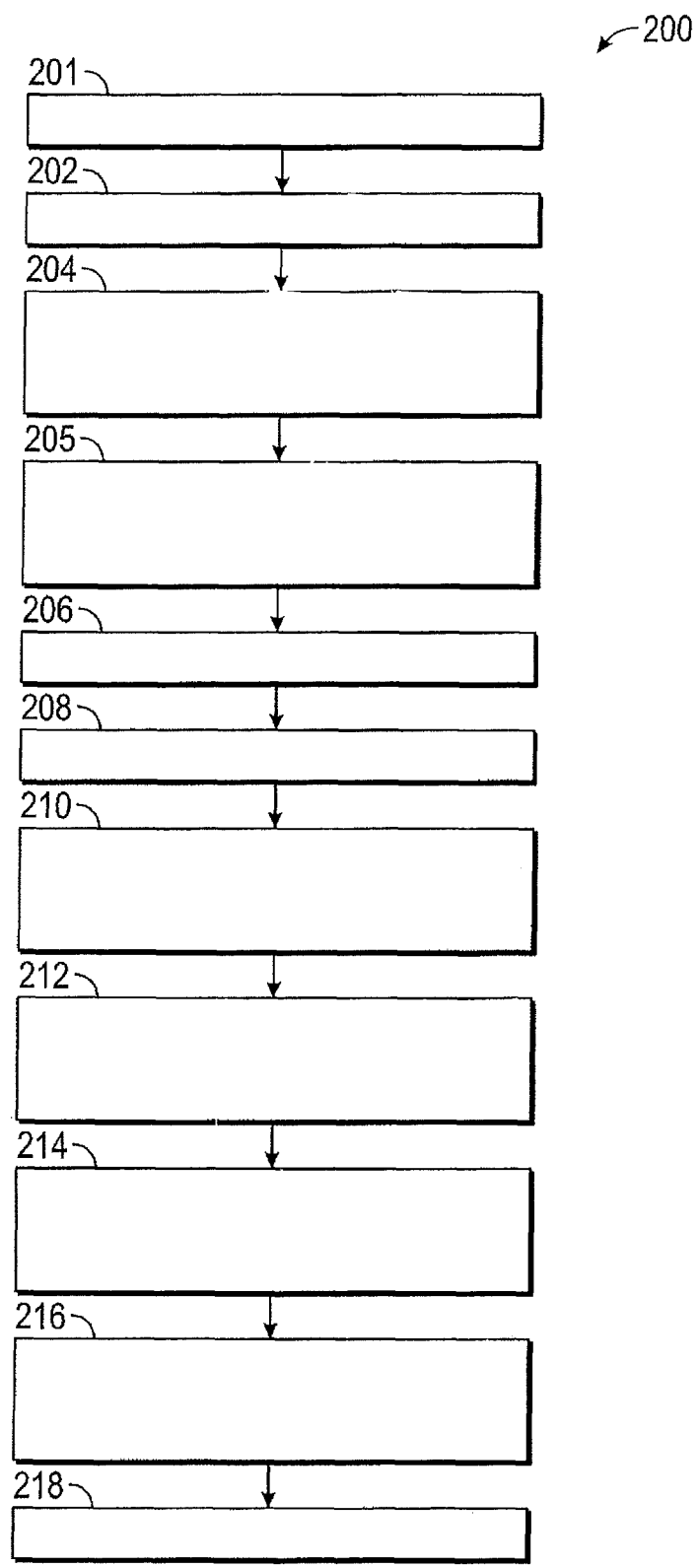
FIG. 4. is a flow chart of a method of inspecting welds of a work product.

Referring to FIG. 4, a method 200 of inspecting a weld 22 of a work product 24 is illustrated. At block 201, a first heat pulse 38 is directed at a work product 24, and from a first perspective 42 established between the work product 24 and a heat source assembly 26, thereby heating the work product 24. At block 202, the work product 24 is cooled during a first-time duration 66 of a pre-determined time period 64.

At block 204, the capturing of a first plurality of successive thermal images 50 of the work product 24 taken at least during the first-time duration 66 is ended. At block 205, capture of a second plurality of successive thermal images 50 during a second time duration 68 is initiated. At block 206, a second heat pulse 40 is directed upon expiration of the first-time duration 66, and from a second perspective 44 different from the first perspective 42. At block 208, the work product 24 is cooled during a second time duration 68 of the pre-determined time period 64. At block 210, the capturing of the second plurality of successive thermal images 50 of the work product 24 taken at least during the second time duration 68 is ended.

At block 212, the first and second plurality of successive thermal images are sent to a processor 52. At block 214, instructions 55 are executed by the processor 52 to transform the first and second plurality of successive thermal images 50 into at least one binary image of at least a portion of the work product 24 that includes at least a portion of the weld 22 (i.e., see compiled binary image 132 in FIG. 5), and to reduce background noise (i.e., reflections and/or blobs). At block 216, the processor 52 applies image geometry and location criteria software to enhance the binary image 104 and further reduce background noise. At block 218, the weld 22 is evaluated via the enhanced binary image and by the processor 52.

Figure 5:
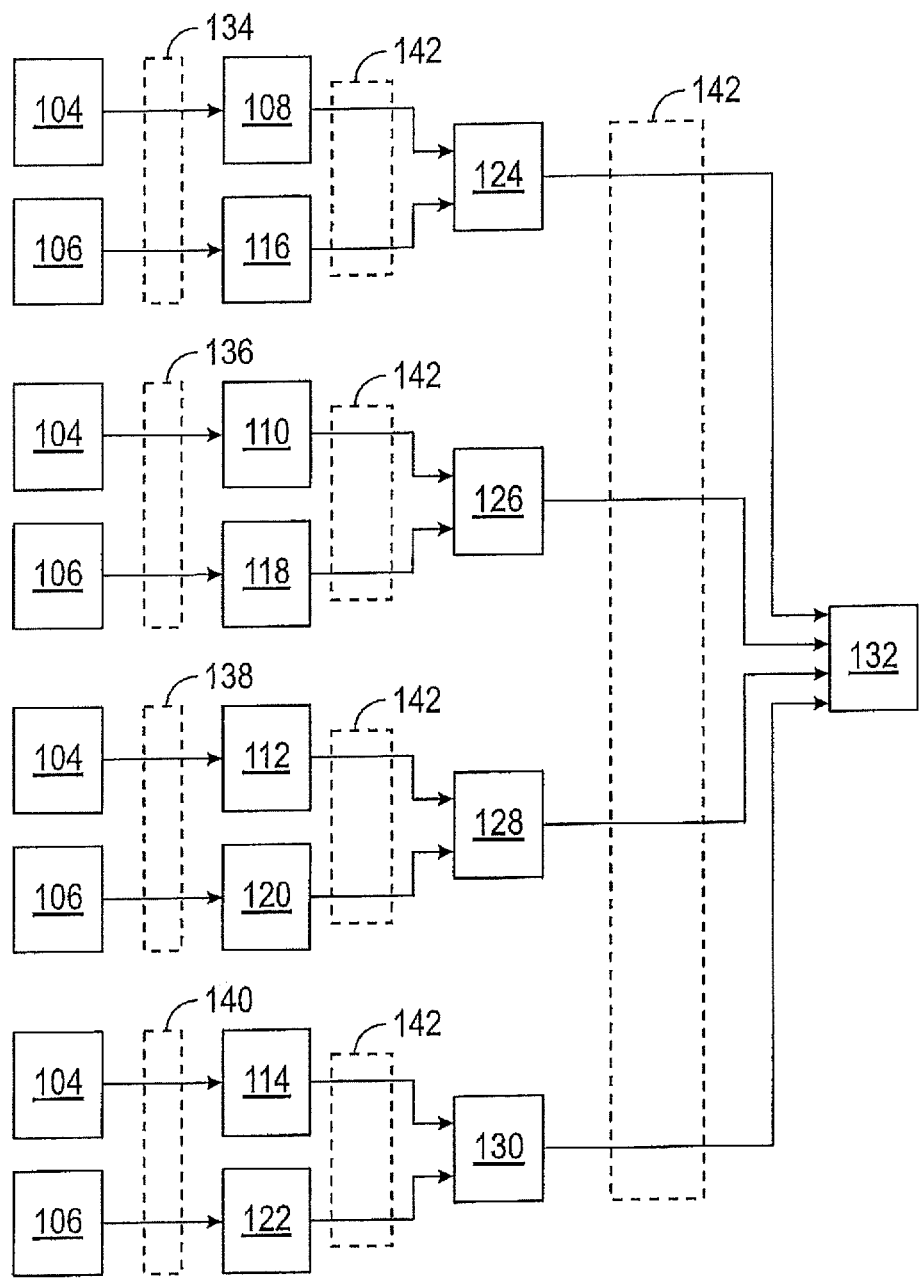
FIG. 5, is a flow diagram illustrating the transformation of raw thermal images into a compiled binary image by the weld inspection system.

Referring to FIG. 5, multiple thermal images are illustrated. The thermal images may include a plurality of raw thermal images (i.e., two illustrated as 104, 106), a plurality of technique specific first binary images (i.e., four illustrated as 108, 110, 112, 114), a plurality of technique specific second binary images (i.e., four illustrated as 116, 118, 120, 122), a plurality of technique specific combined binary images (i.e., four illustrated as 124, 126, 128, 130), and a final or compiled binary image 132. The terms "first" and "second" correspond with results of the respective first heat pulse 38 and second heat pulse 40. The raw thermal images 104, 106 are not binary, and are depicted as heat gradients reflective of varying temperatures of the work product 24.

The first binary images 108, 110, 112, 114 are each associated with the spike 84 of the HSD graphs 82 (or the thermal graphs 58), and the second binary images 116, 118, 120, 122 are each associated with the spike 86 of the HSD graphs 82 (or the thermal graphs 58). Each binary image 108-122 is generally a compilation of all pixels 56 in their initial array/format (see FIG. 3).

The binary images 108-122 are each a compilation of all the pixels 56 after the instructions 55 have processed the thermal imaging data 48. That is, the instructions 55 compare the data originating from the thermal spikes 60, 62 (or spikes 84, 86) to remove thermal reflections and isolated blobs in a variety of ways, and which contribute toward noise. In one example, each pixel 56 is assigned a specific color (e.g., a choice between black and white) and the binary image is formed. More specifically, the instructions 55, via the controller 32, transforms an array of HSD's (i.e., one HSD graph for each pixel) into a binary image.

Figure 7:
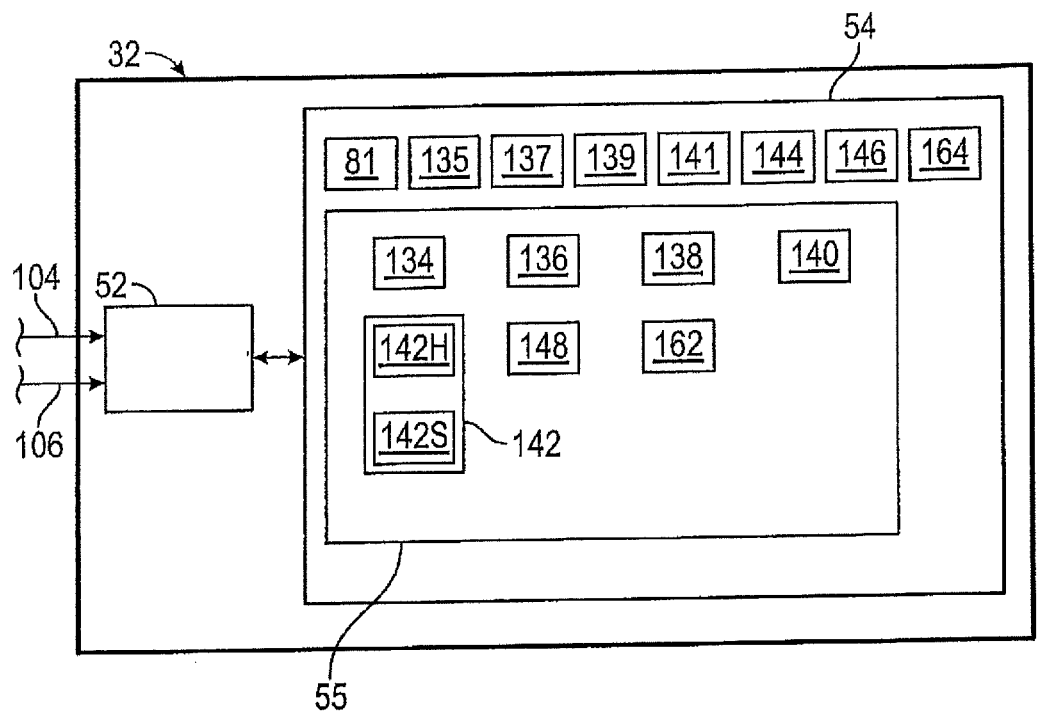
FIG. 7 is a schematic of a controller of the weld inspection system.

Referring to FIGS. 5 and 7, each of the first and second raw thermal images 104, 106 may be refined and transformed into binary images by any number of processing techniques. That is, the instructions 55 may include a plurality of modules. In one example, the instructions 55 include an HSD module 134, an HSD-Shift module 136, a saturation module 138, a data roughness filter or module 140, and a combination module 142. The modules 134-140 are configured to transform the raw thermal images 104, 106 into the respective binary images 108-122. The modules may be chosen via the processor 52 as a function of weld stack-up, work product material, and other factors.

HSD Processing Technique:

The HSD module 134 is generally an interpretation of how fast pixels 56 (i.e. pixel locations) of the work product 24 heat up and cool down, which is a function of thermal behavior. Use of the HSD module 134 is particularly good for traditional welds but may be less ideal for burn-through defects in which the exposed underlying layer (e.g., bus bar) is shiny. The HSD module 134 may be represented by the following where the symbol "&" represents either a "Hard And" logic gate or a "Soft And" logic gate:

$$(HSD_{first} \& HSD_{second})$$

The $HSD_{first}$ represents the array of pixels with the value of each pixel 56 taken from the location where the reference line 100 crosses the graph proximate to the valley region 92 after the HSD spike 84 in the HSD graph 82, which is associated with the first heat pulse 38. Similarly, the $HSD_{second}$ represents the same array of pixels with the value of each pixel 56 taken from the location where the reference line 102 crosses the graph proximate to the valley region 94 after the HSD spike 86, which is associated with the second heat pulse 40.

Application of the HSD module 134 transforms the raw thermal images 104, 106 into the respective binary images 108, 116. The HSD module 134 may generally include a pre-programmed threshold factor 135 (see FIG. 7), where values above the threshold factor 135 are one binary value (i.e., signified by a black color, or the negative cross hatching shown in FIG. 6) and the values below the threshold factor 135 are the other binary value (i.e., signified by a white color, or the positive cross hatching shown in FIG. 6). This, or other thresholding techniques may include an Otsu's thresholding technique, or similar adaptive thresholds may be applied. Learning techniques like neural nets, genetic programming, and/or other learning methods can also be used to refine and improve threshold values and system performance.

HSD-Shift Processing Technique:

The HSD-Shift module 136 is generally an interpretation of how long pixels 56 (i.e., pixel locations) of the work product 24 remain saturated (i.e., see saturation regions 74, 76 of the thermal graph 58 in FIG. 3), which is a function of thermal behavior and emissivity. Use of the HSD-Shift module 136 is particularly good for burn-through defects where background material is seen through the weld 22, but this technique requires fast sample rates to be effective. The HSD-Shift module 136 may be represented by the following, where the symbol "&" represents either the "Hard And" logic gate, or the "Soft And" logic gate:

$$[(HSD\ Shift)_{first}\ \&\ (HSD\ Shift)_{second}]$$

The (HSD Shift)$_{first}$ represents the array of pixels with the value of each pixel 56 taken from the HSD-Shift 96 generally associated with the HSD spike 84 in the HSD graph 82 (see FIG. 3), which is associated with the first heat pulse 38. Similarly, the (HSD Shift)$_{second}$ represents the same array of pixels with the value of each pixel 56 taken from the HSD-Shift 98 generally associated with the HSD spike 86 in the HSD graph 82, which is associated with the second heat pulse 40.

Application of the HSD-Shift module 136 transforms the raw thermal images 104, 106 into the respective binary images 110, 118. The HSD-shift module 136 may generally include a pre-programmed threshold factor 137 (see FIG. 7), where values above the threshold factor 137 are one binary value (e.g., signified by a white color) and the values below the threshold factor 137 are the other binary value (e.g., signified by a black color). This, or other thresholding techniques may include an Otsu's thresholding technique, or similar adaptive thresholds may be applied. Learning techniques like neural nets, genetic programming, and/or other learning methods can also be used to refine and improve threshold values and system performance.

Saturation Processing Technique:

The saturation module 138 is generally an interpretation of portions of the image that are saturated shortly after a particular heat pulse 38, 40, which is a function of emissivity. For some samples where the welded region emissivity differs greatly from the unwelded region emissivity, module 138 can be applied prior to thermal excitation. Use of the saturation module 138 is particularly good for work product materials where the weld 22 differs in emissivity from the work product, or background, itself, but this technique is undesirably affected by "faux" welds that occur in cold-weld cases (i.e., lack of fusion). The saturation module 138 may be represented by the following where the symbol "+" represents the combination module 142:

$$SAT_{f+s} = Sat_{first} + Sat_{second}$$

In one example, the Sat$_{first}$ represents the array of pixels with the value of each pixel 56 taken from saturation region 74 of the thermal spike 60 in the thermal graph 58, which is associated with the first heat pulse 38 (see FIG. 3). Similarly, the Sat$_{second}$ represents the same array of pixels with the value of each pixel 56 taken from the saturation region 76 of the thermal spike 62, which is associated with the second heat pulse 40.

Application of the saturation module 136 transforms the raw thermal images 104, 106 into the respective binary images 112, 120. The saturation module 138 may generally include a pre-programmed threshold factor 139 (see FIG. 7), where values above the threshold factor 139 are one binary value (e.g., signified by a white color) and the values below the threshold factor 139 are the other binary value (e.g., signified by a black color). This, or other thresholding techniques may include an Otsu's thresholding technique, or similar adaptive thresholds may be applied. Learning techniques like neural nets, genetic programming, and/or other learning methods can also be used to refine and improve threshold values and system performance.

Data Roughness Filter Technique:

The roughness module 140 is generally a filter that quantifies the relative change in pixel values and is an interpretation of portions of the image that are not smooth, which is a function of data roughness. Use of the roughness module 140 is particularly good for isolating welded regions from reflection but may result in the detection of sparse blobs. Therefore, the roughness module 140 is preferably used in combination with other techniques or modules. Examples of the roughness module 140 include a range filter, an entropy filter, a standard deviation filter, and others that use these values to quantify the relative change in pixel values, or roughness. The roughness module 140 works particularly well with copper and aluminum stack-ups.

Figure 6:
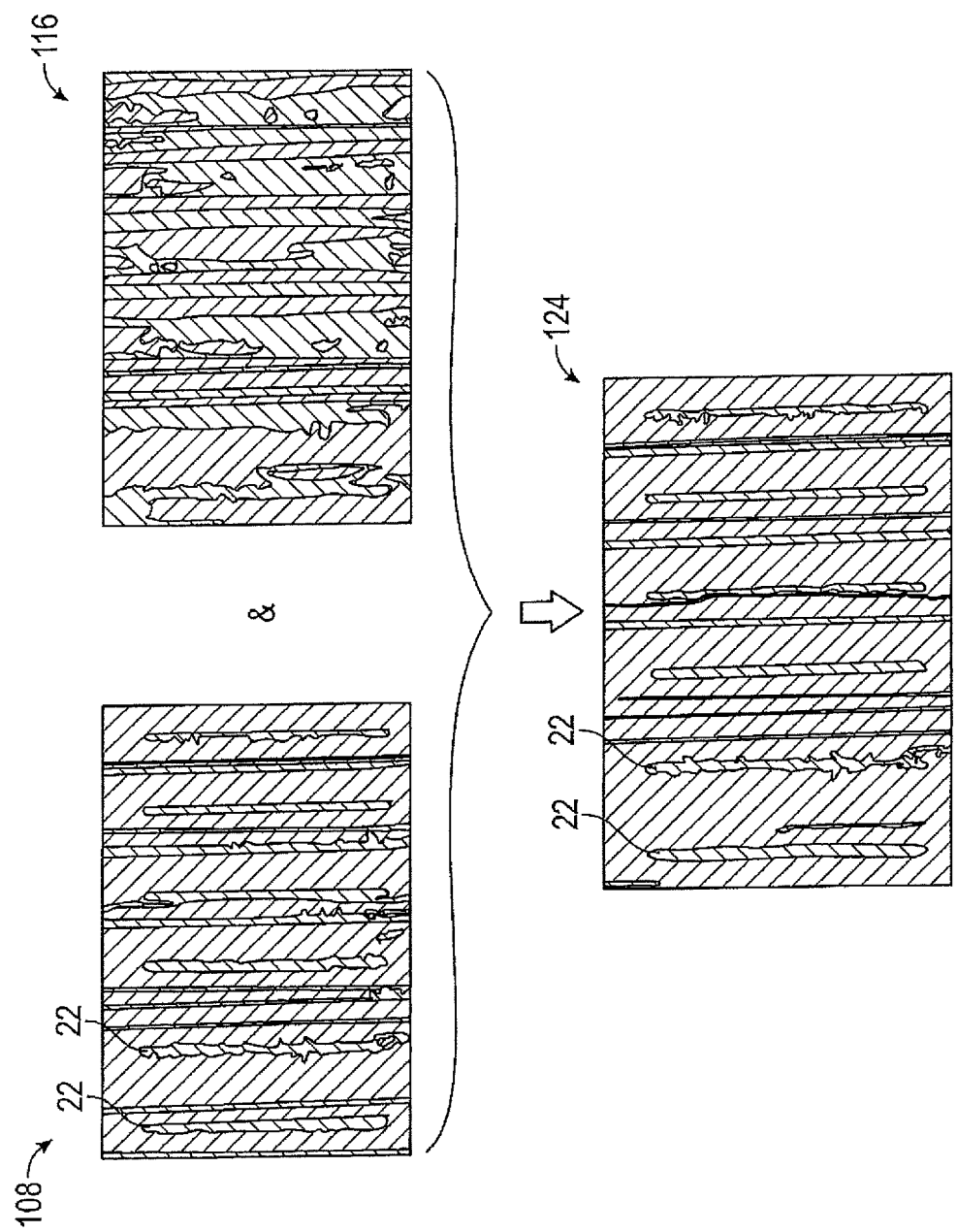
FIG. 6 is an illustration depicting the transformation of two thermal binary images into a combined binary image.

Application of the roughness module 140 transforms the raw thermal images 104, 106 into the respective binary images 114, 122 (see FIG. 5). The roughness module 138 may generally include a pre-programmed threshold factor 141 (see FIG. 7), where values above the threshold factor 141 are one binary value (e.g., signified by a white color) and the values below the threshold factor 141 are the other binary value (e.g., signified by a black color). Alternatively, one single frame, with no thermal excitation can be passed through the roughness module 140. This, or other thresholding techniques may include an Otsu's thresholding technique, or similar adaptive thresholds may be applied. Learning techniques like neural nets, genetic programming, and/or other learning methods can also be used to refine and improve threshold values and system performance Combination Module:

Referring to FIGS. 5 to 7, the combination module 142 of the instructions 55 is configured to transform the binary images 108, 116 into a single combined binary image 124, transform the binary images 110, 118 into a single combined binary image 126, transform the binary images 112, 120 into a single combined binary image 128, and transform the binary images 114, 122 into a single combined binary image 130. FIG. 6 illustrates the first HSD binary image 108 and the second HSD binary image 116 that are transformed by the combination module 142 into the combined binary image 124. In this example, each image 108, 116, 124 illustrate six welds 22. The images 108, 116 depict more noise than the combined binary image 124 after application of the combination module 142. Similar results can be obtained (i.e., cancellation of noise) for the other techniques previously described, and utilizing the coordinated colors (e.g., black and white, where black is illustrated as negative cross hatching and white is illustrated as positive cross hatching in FIG. 6).

Figure 10:
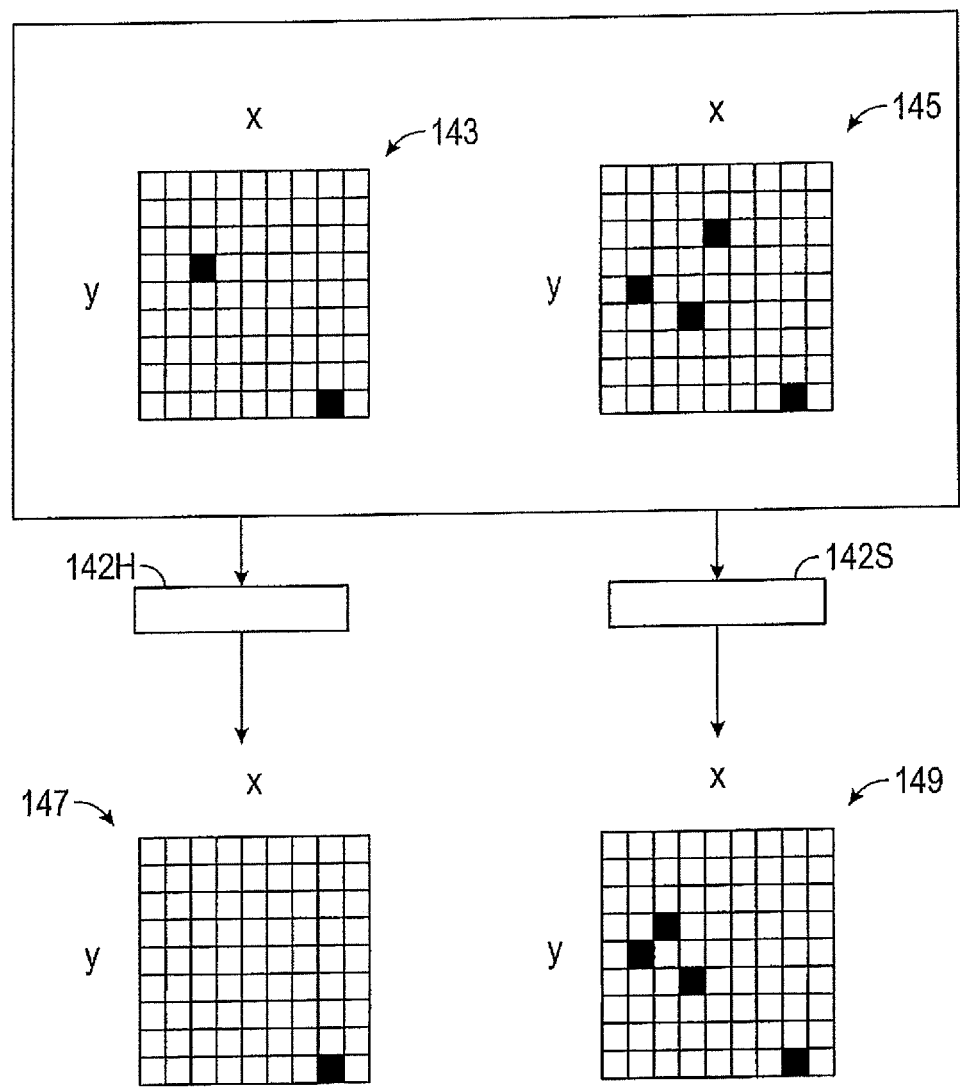
FIG. 10 is a schematic illustrating operation of a combination module of the instructions.

The combination module 142 includes one or both of a hard-And routine 142H and a soft-And routine 142S (see FIGS. 7 and 10). The hard-And routine 142H is a summation of the first and second binary images together to create the combined binary image. More specifically, the combination module 142 may be a conventional logic gate "And," and is the intersection of pixels in the same location between two binary images. For example, and with regard to the hard-And routine 142H, if a pixel "A" of a first binary image has a value of one (i.e., is white), and a pixel B at the same location of pixel "A," but from a second binary image has a value of one, the resulting pixel is given a value of one. However, if one or both pixels have a value of zero (i.e., is black), the corresponding pixel of the combined image has a value of zero. In another embodiment, the combination module may be, or may include an "Or" logic gate. It is understood that the soft-And routine 142S, the hard-And routing 142H, and the "Or" logic gate are forms of a mathematical operator.

The soft-And routine 142S of the combination module 142 is more of a "soft-And" algorithm and is essentially a relaxed version of a hard-And logic gate. The soft-And routine 142S considers not only the corresponding pixels at a given location, but also the neighboring pixels in the vicinity. If one of the pixel values at a given location is one and the other is zero, the resulting, combined, binary image may still result in a pixel with a value of one if a user-defined number of pixels 144 within a user defined neighboring vicinity 146 has a value of one. Note the user can choose whether the neighboring pixel search regime is defined by one of the binary images, or both.

Referring to FIG. 10, and as an illustrative example, binary images 143, 145 are depicted. When the binary images 143, 145 are combined by the hard-And routine 142H, the resulting combined binary image 147 is obtained. When the binary images 143, 145 are combined by the soft-And routine 142S, the resulting combined binary image 149 is obtained.

In other embodiments, the hard-And and soft-And routines 142H, 142S of the combination module 142 may be used at different steps in the formation of the compiled binary image 132. For example, the hard-And routine 142H may be applied to the HSD binary image 124 and the HSD-Shift binary image 126 to get a resulting binary image (not illustrated). The resulting binary image may be represented as follows:

$$HSD\ \&\ HSD\text{-}Shift = (HSD_{first}\ \&\ HSD_{second})\ \&\ [(HSD\ Shift)_{first}\ \&\ (HSD\ Shift)_{second}]$$

The system 20 may then apply the soft-And routine 142S to the resulting binary image (i.e., HSD & HSD-Shift) and the saturation combined binary image 128. In this example, the soft-And routine 142S may be represented by the following logic statement:

$$\text{If } (SatF_{F+S}(ii,jj)=2)|(Sat_{F+S}(ii,jj)=1\ \&\ \text{any (HS-DandHSDShift}(ii-5: ii+5,jj-5:jj+5)=1))\ \text{then BinaryImage}(ii,jj)=1$$

In this logic statement "ii, jj" represents the pixel location in the frame 50, the numeral "5" represents the user defined neighboring vicinity 146 and may be changed/adjusted by a user, and the "BinaryImage" represents the compiled binary image 132. Also, in this example, the roughness module 140 may not be applied.

In another embodiment, and generally as illustrated in FIG. 5, the combination module 142 may be applied directly to all four of the combined binary images 124, 126, 128, 130 to generate the compiled binary image 132.

Image Geometry and Location Criteria:

With the formation of the compiled binary image 132, the instructions 55 may include, or apply, an image geometry process (i.e., module 148 in FIG. 7) that analyzes the compiled binary image 132 itself, and prior to using the image to establish the quality of the weld 22. The image geometry process is not performed at a pixel level, and instead views the compiled binary image 132 as a whole.

Figure 8:
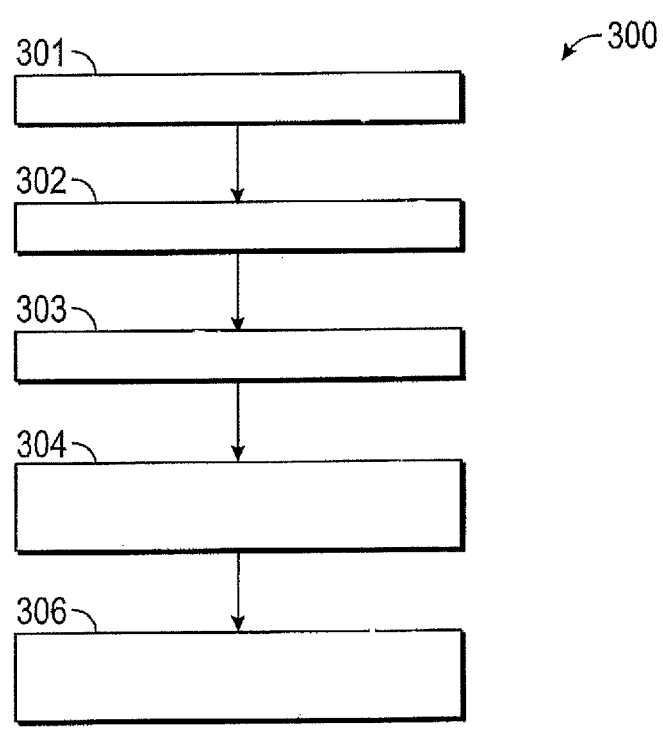
FIG. 8 is a flow chart of a method of operation by an image geometry process module of instructions executed by the controller.
Figure 9:
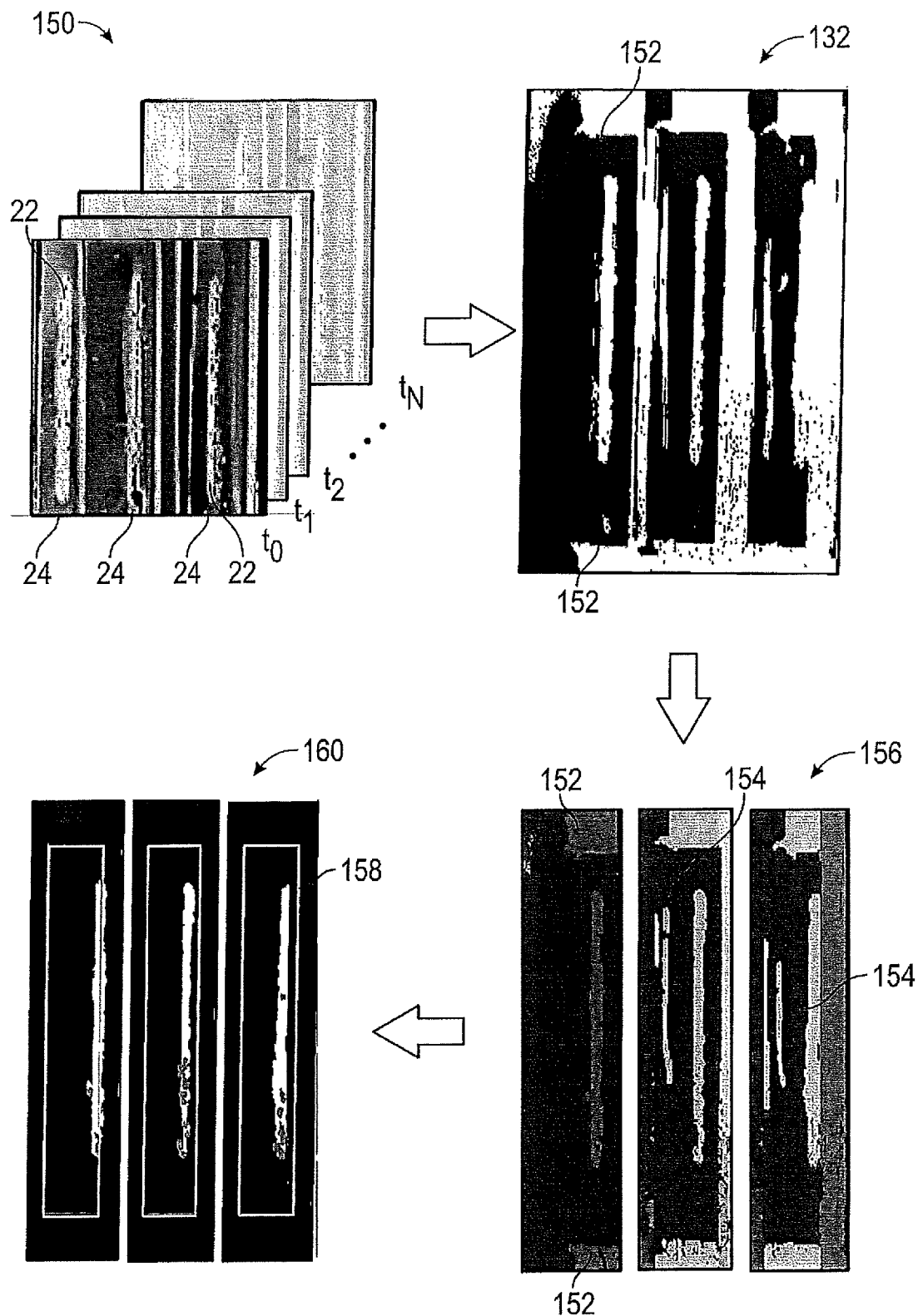
FIG. 9 is an illustration of a plurality of successive thermal images in time and binary images, and further depicting image refinement results of the image geometry process module.

Referring to FIGS. 8 and 9, the image geometry process 300 may include at block 301, a step of establishing at least one reference point 152 (see FIG. 9). Once established, and at block 302, the images of the welds are windowed. At block 303, a binary image is created. At block 304, weld blobs 154 are identified, and segmented when needed. At block 306, a weld blob analysis is conducted for weld assessment.

To further process, the compiled binary image 132, the reference point 152 is established to confirm that the weld image is in the window 158. In one example, the reference point 152 may be an edge of the work product 24. In this example, the proper (i.e., expected) weld location is preprogrammed into the controller 32 with reference to the work product edge. In another example, top and bottom edges (or left and right edges) of the work product image may be scanned to establish the edge reference point. In this example, the binary image includes more (i.e., images beyond) than the work product 24 itself. In other examples, any known feature of the work product 24 may be applied to establish the reference point. With the size and orientation of the weld preprogrammed into the controller 32, and use of the reference point 152, the imaged weld may then be windowed.

Referring to FIG. 9, a plurality of raw thermal images 150 depicting three separate work products 24 each having a single weld 22 is illustrated. The plurality of raw thermal images 150 is transformed into the compiled binary image 132 as previously described. From the compiled binary image, the image geometry process module 148 is configured to classify the blobs 154 as seen in image 156. Image processing techniques are used to reduce noise and other artifacts associated with extraneous blobs. The blobs are segmented, if necessary, to separate the weld blob from the other product features. Then the weld blob is established by choosing the blob which most represents the weld 22 by use of templates, or adherence to certain established weld determining characteristics. Once classified, the module 148 places windows 158 about each weld 22, and as best shown in the refined compiled binary image 160.

Weld Assessment:

Referring to FIGS. 7 and 9, the instructions 55 may further include a weld assessment module 162. The weld assessment module 162 may be configured to use the refined compiled binary image 160 and determine weld geometry to assess the welds 22. For example, the weld geometry may include an assessment of any one or more of the weld image perimeter, area, width, and length. Measuring of weld perimeter is particularly useful to determine a condition of weld burn through, since a burned through weld typically have a larger perimeter than an ideal weld. That is, the measured weld perimeter is compared to a pre-programmed weld perimeter threshold value 164 (see FIG. 7). Another example of weld geometry includes weld proximity with tab edge and other work product features.

Figure 11:
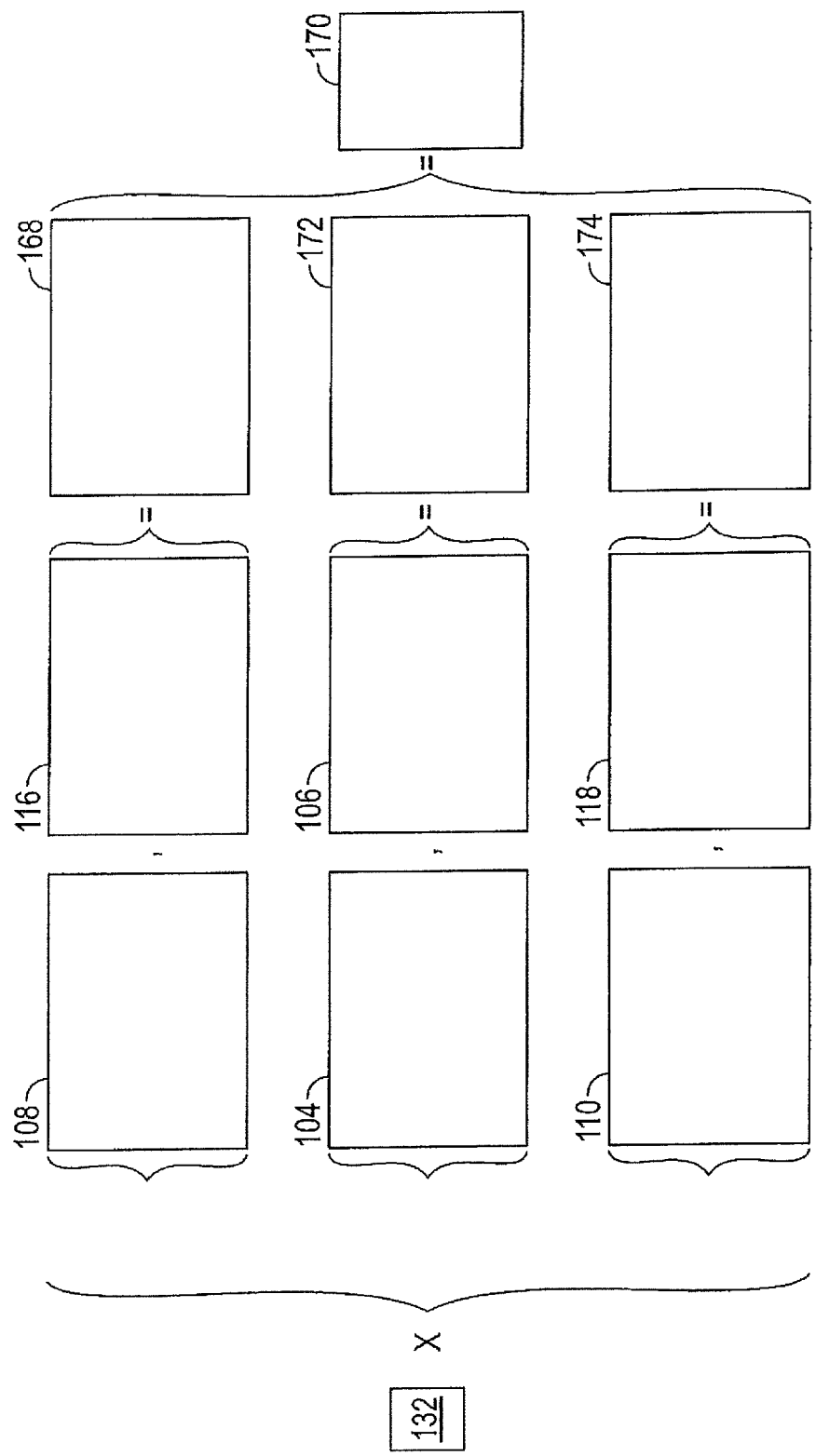
FIG. 11 is a flow chart of a method of enhancing the compiled binary image for weld assessment.

Referring to FIG. 11, the enhanced compiled binary image 132 may be multiplied by the raw or processed thermal data to assess the weld 22. In one example, the compiled binary image 132 may be multiplied by a binary image 168 that is an average of the HSD binary images 108, 116 to get a final data image 170 for weld assessment. In another example, the compiled binary image 132 may be multiplied by a binary image 172 that is an average of the raw thermal images 104, 106 to get the final data image 170 for weld assessment. In yet another example, the compiled binary image 132 may be multiplied by a binary image 174 that is an average of the HSD-Shift binary images 110, 118 to get the final data image 170.

Advantages and benefits of the present disclosure include a means of detecting high electrical resistance and low strength welds. Other benefits include thermographically, and nondestructively, inspecting welds on work products that may be highly reflective, thin, non-planar, and/or highly conductive. Other advantages include the absence of any need to paint the work product a flat black to reduce reflections. Yet further, the weld inspection system 20 may include an IR camera 28 having a high frame-rate and a high resolution to ensure that temperature/time signals can be time differentiated and small local variation are observed.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. A non-transitory computer readable medium having a computer storage product stored thereon to execute by a processor of a weld inspection system, and configured to facilitate the inspection of a weld of a work product, the non-transitory computer readable medium comprising:
   a first module configured to transform first and second raw thermal images associated with respective first and second heat pulses of at least a portion of the work product having the weld into respective first and second binary images;
   a saturation module configured to transform the first and second raw thermal images into respective first and second saturation binary images, wherein each of the first and second saturation binary images include saturation regions indicative of energy from the first and second heat pulses reflecting off of the work product; and
   utilizing the saturation regions by the processor to determine the location of the weld upon the work product.

2. A computer software product executed by a processor and stored in an electronic storage medium of a weld inspection system, and configured to facilitate the inspection of a weld of a work product, the computer software product comprising:
   a first module configured to transform first and second raw thermal images associated with respective first and second heat pulses of at least a portion of the work product having the weld into respective first and second binary images;
   a combination module configured to transform the first and second binary images into a combined binary image for the reduction of noise;
   a second module being at least one of a saturation module and a Heat Source Distribution (HSD) module, wherein the saturation module is configured to transform the first and second raw thermal images into respective first and second saturation binary images, the HSD module is configured to transform the first and second raw thermal images into respective first and second HSD binary images, the combination module being configured to transform the first and second saturation binary images into a combined second binary image when the saturation module is applied, and the combination module being configured to transform the first and second HSD binary images into the combined second binary image when the HSD module is applied;
   wherein the first module is a data roughness module, the first and second binary images are first and second roughness binary images, and the combined binary image is a combined roughness binary image; and
   wherein the combination module is further configured to at least sum the combined roughness binary image with the combined second binary image to reduce noise and generate a compiled binary image.

3. The computer software product set forth in claim 2, further comprising:
   an image geometry process module configured to evaluate the compiled binary image via geometry of the image itself.

4. The computer software product set forth in claim 2, further comprising:
   an image geometry process module configured to evaluate the compiled binary image via geometry of the image itself to reduce noise and generate a refined compiled binary image.

5. The computer software product set forth in claim 4, further comprising:
   a weld assessment module configured to evaluate the refined compiled binary image and apply weld geometry to assess the weld.

6. The computer software product set forth in claim 5, wherein the assessment of the weld includes a comparison of a weld perimeter to a preprogrammed weld perimeter threshold value.

7. A computer software product executed by a processor and stored in an electronic storage medium of a weld inspection system, and configured to facilitate the inspection of a weld of a work product, the computer software product comprising:
   a first module configured to transform first and second raw thermal images associated with respective first and second heat pulses of at least a portion of the work product having the weld into respective first and second binary images;
   a combination module configured to transform the first and second binary images into a combined binary image for the reduction of noise;
   a saturation module configured to transform the first and second raw thermal images into respective first and second saturation binary images, and the combination module being configured to transform the first and second saturation binary images into a combined saturation binary image;

wherein the first module is a HSD module, the first and second binary images are first and second HSD binary images, and the combined binary image is a combined HSD binary image; and wherein the combination module is further configured to at least sum the combined HSD binary image with the combined saturation binary image to reduce noise and generate a compiled binary image.

8. The computer software product set forth in claim 7, further comprising:

a HSD-Shift module configured to transform the first and second raw thermal images into respective first and second HSD-Shift binary images, and the combination module being configured to transform the first and second HSD-Shift binary images into a combined HSD-Shift binary image, wherein the combination module is further configured to at least sum the combined HSD binary image, the combined HSD-Shift binary image, and the combined saturation binary image to reduce noise and generate the compiled binary image.

9. The computer software product set forth in claim 7, further comprising:

a roughness module configured to transform the first and second raw thermal images into respective first and second roughness binary images, and the combination module being configured to transform the first and second roughness binary images into a combined roughness binary image, wherein the combination module is further configured to at least sum the combined HSD binary image, the combined saturation binary image, the combined saturation binary image, and the combined roughness binary image to reduce noise and generate the compiled binary image.

10. A non-transient computer readable medium containing program instructions for causing a system to perform the method of:

establishing a reference point relative to a compiled binary image of a work product;

windowing an image of a weld of the work product relative to the reference point;

identifying and segmenting weld blobs;

extracting the weld blobs to generate a refined compiled binary image for weld assessment; and multiplying binary weld blobs by at least one of raw data and processed thermal data for weld assessment.

11. The non-transient computer readable medium set forth in claim 10, further comprising:

geometrically assessing a weld image of the refined compiled binary image to determine weld quality, wherein the geometric assessment includes locating the weld and performing a pixel distribution analysis.

12. The non-transient computer readable medium set forth in claim 11, wherein the geometric weld assessment measures a weld perimeter and compares the weld perimeter to a pre-programmed weld perimeter threshold value.

13. The weld inspection system set forth in claim 12, wherein each of the first and second HSD binary images, the combined HSD binary image, the first and second saturation binary images, and the combined saturation binary image include a common array of pixel locations, wherein the HSD module is configured to assign a respective binary value to each pixel location of the first and second HSD binary images based on an evaluation of the corresponding location of the respective at least one first and at least one second raw thermal images, and wherein the saturation module is configured to assign a respective binary value to each pixel location of the first and second saturation binary images based on an evaluation of the corresponding location of the respective at least one first and at least one second raw thermal images.

14. The weld inspection system set forth in claim 13, wherein the combination module is configured to sum each pixel location of the first HSD binary image to the corresponding pixel location of the second HSD binary image to generate the combined HSD binary image, and wherein the combination module is configured to sum each pixel location of the first saturation binary image to the corresponding pixel location of the second saturation binary image to generate the combined saturation binary image.

15. The weld inspection system set forth in claim 14, wherein the combination module is further configured to at least sum the combined HSD binary image with the combined saturation binary image to reduce noise and at least in-part generate a compiled binary image.

16. The weld inspection system set forth in claim 15, further comprising: an image geometry process module configured to evaluate the compiled binary image via geometry of the image itself.

17. A weld inspection system adapted to inspect a weld of a work product, the weld inspection system comprising:

a heat source assembly adapted to sequentially direct first and second heat pulses upon the work product from varying perspectives and within respective first and second time durations;

a thermal imaging camera configured to generate at least one first raw thermal image during the first time duration and at least one second raw thermal image during the second time duration, wherein the at least one first raw thermal image is associated with the first heat pulse and the at least one second raw thermal image is associated with the second heat pulse; and a controller configured to control the heat source assembly and the thermal imaging camera, the controller including a processor configured to receive the at least one first and second raw thermal images and execute instructions, the instructions including:

at least two modules including at least two of a roughness module, a saturation module, a Heat Source Distribution (HSD) module, and a HSD-Shift module, the roughness module being configured to transform at least one of the first and second raw thermal images into respective first and second roughness binary images when applied, the saturation module being configured to transform the first and second raw thermal images into respective first and second saturation binary images when applied, the HSD module being configured to transform the first and second raw thermal images into respective first and second HSD binary images when applied, and the HSD-Shift module being configured to transform the at least one first and second raw thermal images into respective first and second HSD-Shift binary images when applied, and a combination module configured to transform the first and second roughness binary images into a combined roughness binary image, transform the first and second saturation binary images into a combined saturation binary image, transform the first and second HSD binary images into a combined HSD binary image, and transform the first and second HSD-Shift binary images into a combined HSD-Shift binary image for the reduction of noise, wherein the combination module is further configured to transform at least two of the combined roughness binary image, the combined saturation binary image, the combined HSD binary image, and the combined HSD-Shift binary image into a compiled binary image for the reduction of noise.

* * * * *